United States Patent
Keohane et al.

(10) Patent No.: US 7,984,095 B2
(45) Date of Patent: *Jul. 19, 2011

(54) APPARATUS, SYSTEM AND METHOD OF EXECUTING MONOLITHIC APPLICATION PROGRAMS ON GRID COMPUTING SYSTEMS

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/352,870

(22) Filed: Jan. 13, 2009

(65) Prior Publication Data

US 2009/0157793 A1  Jun. 18, 2009

Related U.S. Application Data

(63) Continuation of application No. 10/666,791, filed on Sep. 18, 2003, now Pat. No. 7,493,358.

(51) Int. Cl.
*G06F 15/16* (2006.01)

(52) U.S. Cl. ......... 709/201; 717/127; 709/224; 718/100
(58) Field of Classification Search .................. 709/201, 709/205, 224; 717/140–141; 718/100
See application file for complete search history.

(56) References Cited

U.S. PATENT DOCUMENTS

| | | | |
|---|---|---|---|
| 5,734,865 A | 3/1998 | Yu | |
| 5,737,623 A | 4/1998 | Liebrock | |
| 5,910,903 A | 6/1999 | Feinberg et al. | |
| 5,996,012 A | 11/1999 | Jarriel | |
| 6,460,068 B1 | 10/2002 | Novaes | |
| 6,640,238 B1 | 10/2003 | Bowman-Amuah | |
| 6,769,115 B1* | 7/2004 | Oldman | 717/126 |
| 7,181,731 B2 | 2/2007 | Pace et al. | |
| 2002/0078255 A1* | 6/2002 | Narayan | 709/316 |
| 2002/0120734 A1 | 8/2002 | Riosa et al. | |
| 2002/0124094 A1 | 9/2002 | Chang et al. | |
| 2002/0140986 A1 | 10/2002 | Takayama | |
| 2002/0162095 A1 | 10/2002 | Conrad et al. | |
| 2004/0226004 A1 | 11/2004 | Oldman | |
| 2005/0273511 A1* | 12/2005 | Ferreira de Andrade et al. | 709/227 |
| 2006/0184926 A1* | 8/2006 | Or et al. | 717/168 |

OTHER PUBLICATIONS

"Requirements of Network Monitoring for the Grid", by Robin Tasker, Feb. 22, 2001.
"User Program Development Tools for the Grid (UPDT)", UPDT Research Group Charter (Draft), Sep. 17, 2002.
"A Grid Application Toolkit (GAT)", by GridLab, Mar. 1, 2003.
"GridLab Testbed Status", by GridLab, May 30, 2003.

* cited by examiner

*Primary Examiner* — Salad Abdullahi
(74) *Attorney, Agent, or Firm* — Matthew B. Talpis; James L. Baudino (57) ABSTRACT

An apparatus, system and method of executing a monolithic application program successfully on a grid computing system are provided. Before the program is executed on the grid computing system, the program is executed on a computer on which the program has previously been successfully executed. During its execution, the program is monitored to collect its runtime information. The runtime information is provided to the grid computing system. With this information the grid computing system is able to successfully execute the program.

15 Claims, 7 Drawing Sheets

APPARATUS, SYSTEM AND METHOD OF EXECUTING MONOLITHIC APPLICATION PROGRAMS ON GRID COMPUTING SYSTEMS

RELATED APPLICATIONS

This application is a continuation of U.S. patent application Ser. No. 10/666,791, filed Sep. 18, 2003, now U.S. Pat. No. 7,493,358 entitled "APPARATUS, SYSTEM AND METHOD OF EXECUTING MONOLITHIC APPLICATION PROGRAMS ON GRID COMPUTING SYSTEMS", which is hereby incorporated by reference herein.

BACKGROUND OF THE INVENTION

1. Technical Field

The present invention is directed to execution of programs on grid computing systems. More specifically, the present invention is directed to a system and method of executing monolithic programs on grid computing systems.

2. Description of Related Art

With the advent of the Internet and the availability of powerful computers and high speed networks, geographically dispersed computers are beginning to be used as one single unified computing resource. This computing resource is popularly referred to as grid computing (also known as meta-computing, scalable computing, global computing, Internet computing and peer-to-peer computing). In grid computing, resources such as supercomputers, storage systems, data sources etc. which are owned by different organizations are pooled together to solve large-scale computational and data intensive problems in science, engineering and commerce.

To allow for an effective use of grid computing, a grid broker is used. The grid broker performs resource discovery and scheduling of tasks on the distributed grid resources. Thus, if the grid broker receives a request from a computer in New York to process an application program, the grid broker may, based on a resource discovery result, schedule the application program to be processed by a computer in Paris, France.

This concept works fine with application programs that are grid-computing compatible or have been designed to be processed by any computer system on a grid computing system. However, many older application programs (i.e., legacy programs) are monolithic. A monolithic application program is a program that does not rely on outside resources and cannot access or provide services to other applications in a dynamic and cooperative manner. An example of such an application program is a program that may link to specific (local) libraries or read from and/or write to specific remote filesystems etc.

Due to the nature of monolithic application programs, they may not run effectively on a grid computing system without modifications. To modify a monolithic program, however, requires that software personnel acquire intimate knowledge of the program. In some instances, this may be quite a time-consuming and work-intensive endeavor, especially, when there is only an object code of the program available and all software personnel who may have designed and developed the program cannot be located.

Consequently, what is needed is an apparatus, system and method of executing a monolithic application program successfully on a grid computing system without modifications.

SUMMARY OF THE INVENTION

The present invention provides an apparatus, system and method of executing a monolithic application program successfully on a grid computing system. Before the program is executed on the grid computing system, the program is executed on a computer on which the program has previously been successfully executed. During its execution, the program is monitored to collect its runtime information. The runtime information is provided to the grid computing system. With this information the grid computing system is able to successfully execute the program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
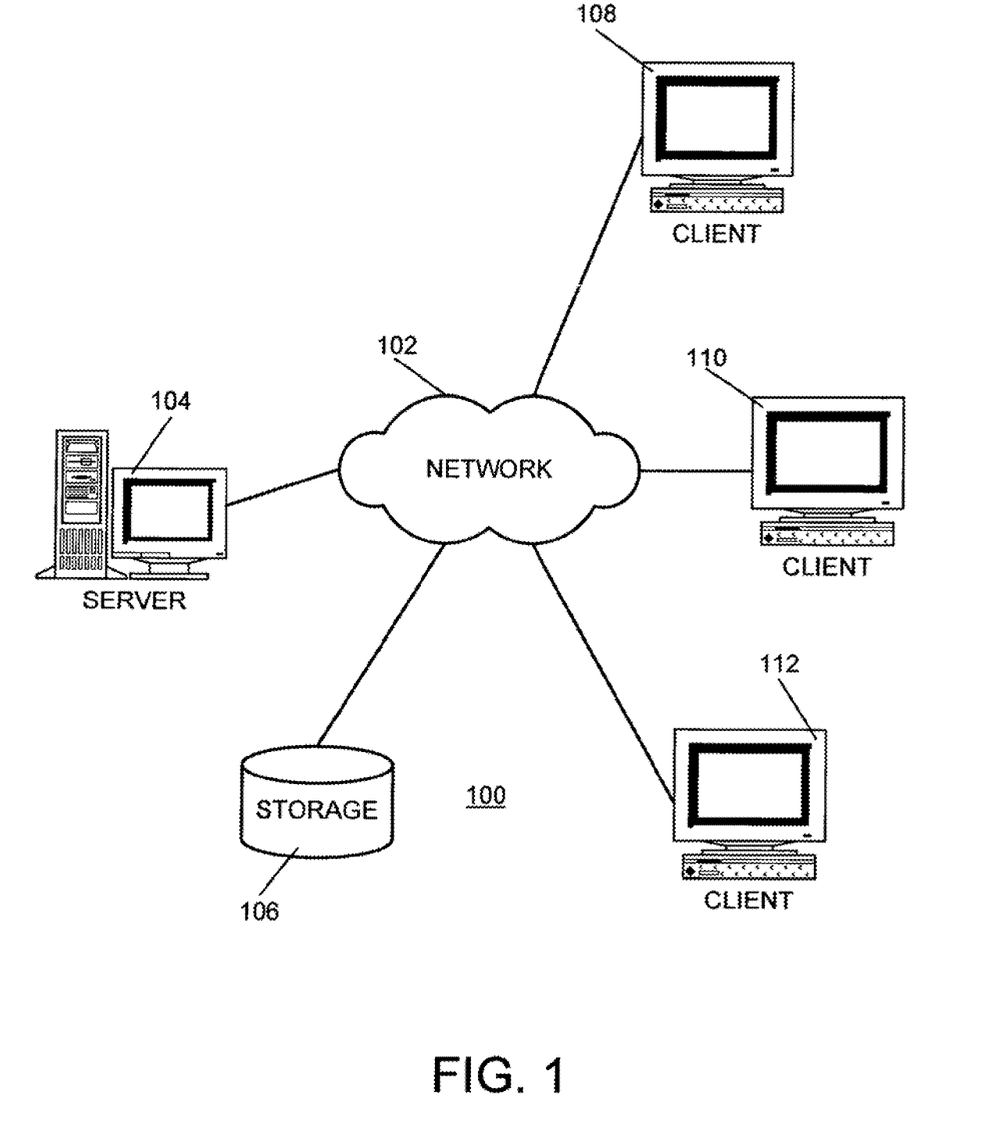
FIG. 1 is an exemplary block diagram illustrating a distributed data processing system according to the present invention.

With reference now to the figures wherein like reference numerals refer to like parts, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
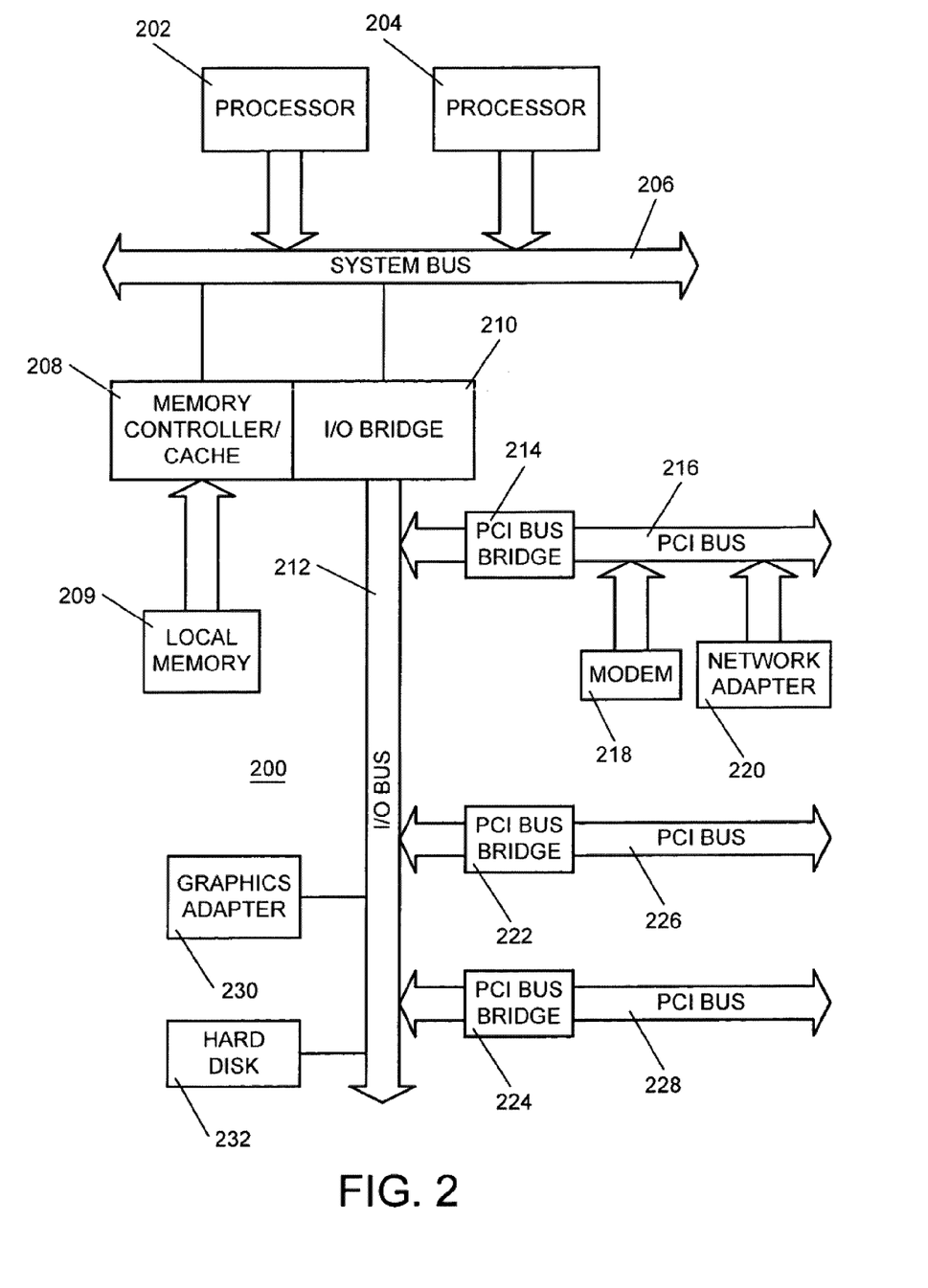
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
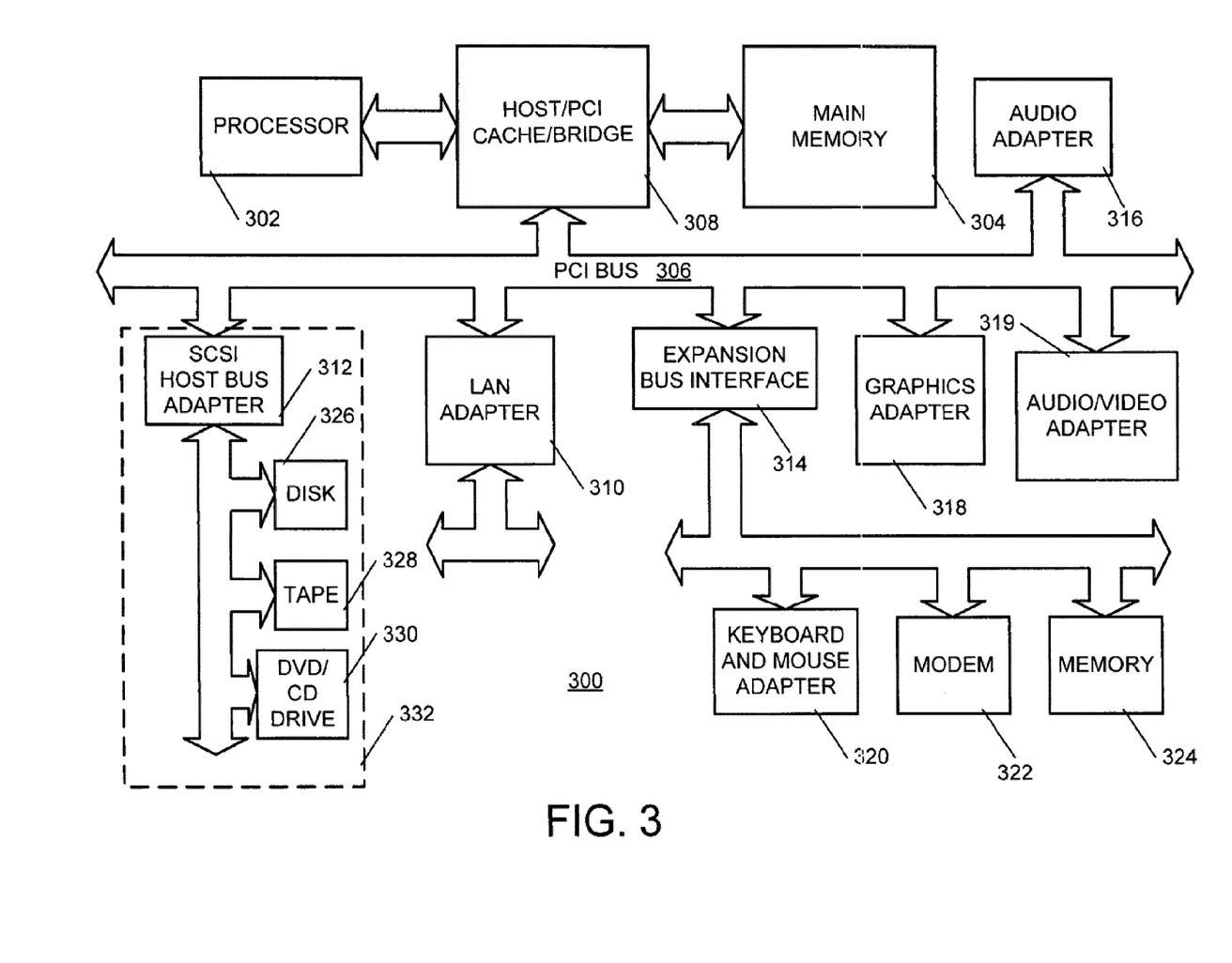
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of having a monolithic application program successfully execute on a grid computing system without modifications. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, RAM, etc.) used by a computer system.

Figure 4:
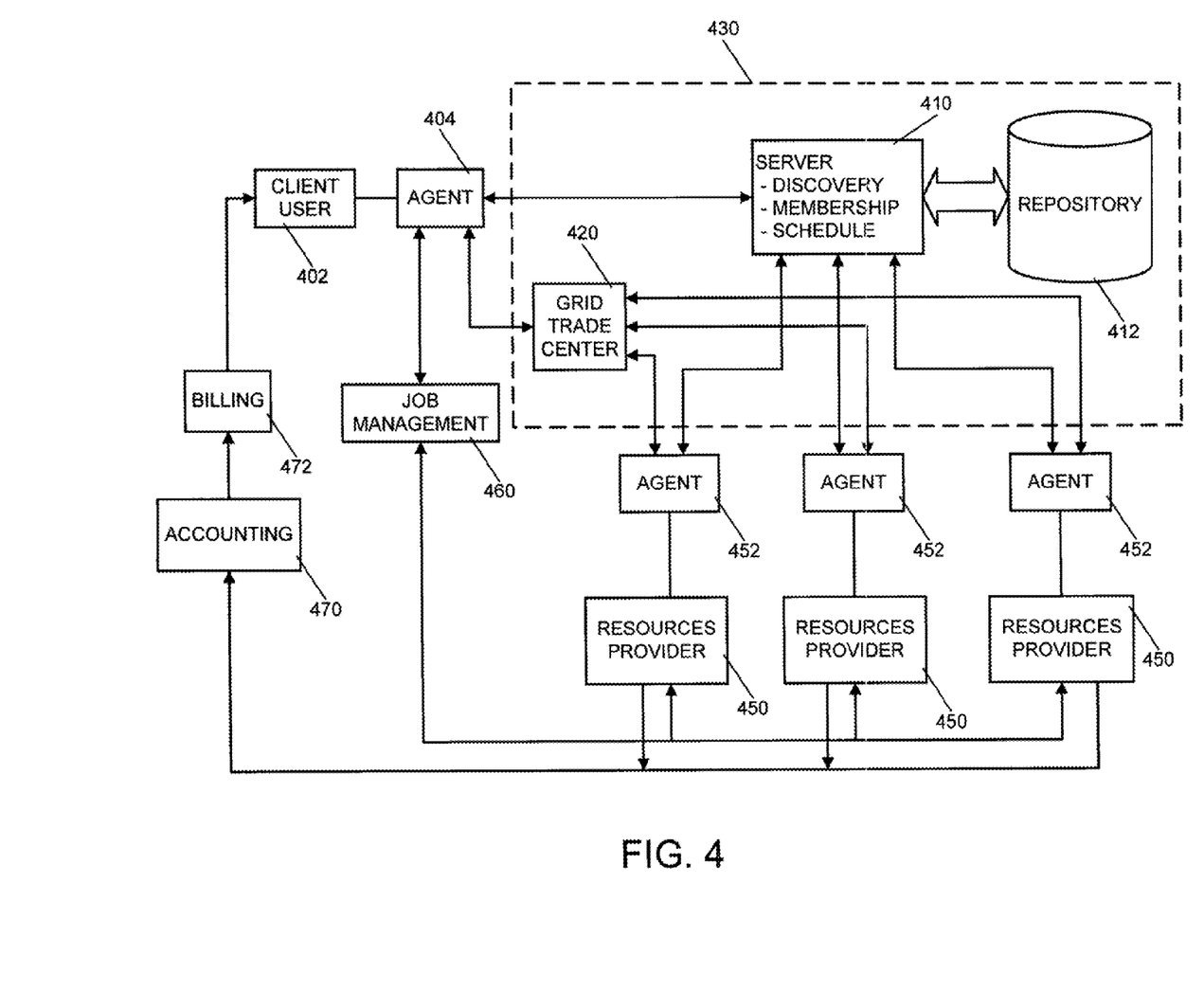
FIG. 4 illustrates a representative grid computing system.

FIG. 4 illustrates a representative grid computing system. The grid computing system contains a client user 402 with an agent 404 running thereon. The grid computing system further contains a server 410 connected to a data repository 412, a grid trade center 420, a plurality of resources providers 450 with agent 452 running thereon, a job management 460, accounting system 470 and billing system 472.

The server 410, repository 412 and grid trade center 420 for all intent and purpose form the grid broker 430. Particularly, when user 402 needs to have a program processed by the grid computing system, it will so notify server 410 using agent 404. Upon receiving the notification, the server 410 will consult data repository 412 to determine which resources providers are available to process the program. In this particular example, the server 410 indicates that resources providers 450 are able to process the program. Using this information, the client user 402 then establishes accounts with resources providers 450 through grid trade center 420. The client user 402 then notifies the server 410 which will schedule the program for processing.

Note that the above scenario is one of a plurality of scenarios that may used by a grid computing system to schedule tasks. In other scenarios, the broker may lease grid resources and services depending on their capability, cost and availability driven by user quality of service (QoS) requirements. In those instances, a user may set a deadline by which results of a task are needed. The broker then has to find the cheapest computational resources available on the grid and use them such that the user deadline is met and the cost of computation is kept to a minimum. Thus, the scenario outlined above is used for illustrative purposes only.

In any case, the client user may manage the processing of the program through job management system 460. The job management system 460 may be an I/O server where a task script (not shown) containing executing commands may be stored. Note that the server 410 may deploy agents 452 on the resources providers 450 in order to manage the scheduling and execution of assigned tasks. After execution of a task, the leasing rate and execution time may be sent to accounting system 470 where a bill may be sent to client user 402 through billing system 472.

As mentioned in the Description of Related Art Section, monolithic application programs may not be able to be processed by a grid computing system. For example, suppose an application program uses a library file "A" that is local to a computer system on which it normally executes. Suppose, further, that the program reads from and writes to a file system "B". Then, in order for the program to successfully execute, file "A" must be loaded in the system memory of the computer system executing the program or linked to (depending on the implementation) the executing program. In addition, file system "B" must be mounted on the computer system in order for the program to be able to read from and write to it. Since when the program is being executed on a grid computing system it is most likely being executed by a computer system that does not have file "A" stored thereon and/or file system "B" mounted thereon, a runtime error will most probably ensue.

The present invention provides a grid application survey (GAS) which may be used to enable a monolithic application program to be processed on a grid computing system without runtime errors. According to the invention, before a monolithic application program is ever processed on a grid, it is executed on a computer system on which it has previously successfully executed in conjunction with the GAS. The GAS monitors the execution of the program and records its runtime requirements. Specifically, the GAS monitors the computer's logical file system for accesses to remote file systems such as networked file systems (NFSs) etc. The GAS then records the necessary mount information from the logical file system's mount table.

A logical file system provides functions required to map system call requests to virtual file system requests. The logical file system is responsible for resolution of file names and file descriptors. It tracks all open files in the system using a file table.

An NFS is used to allow hosts to share files across a network. The NFS operates on a client-server basis using network messages to transfer requests and data between clients and servers. Provided that appropriate drivers are installed, several different sorts of file systems may be mounted. These file systems may include normal Unix file systems, NFSs, "High Sierra" file systems (i.e., on a CDROM) and MSDOS file system (known as PCFS) on a floppy disc. Such systems are integrated into the Unix virtual file system using mount commands.

The GAS also monitors and records files that are linked to the program and/or loaded into memory at runtime. For example, if file "A" of the example above, was loaded in memory of the computer system executing the program or linked to the program, the GAS will note that information down.

The GAS uses the information gathered to generate a setup script that contains all necessary mount information as well as information regarding all files that are linked to and/or loaded in memory. The script may then be incorporated into the task script in the job management system 460. Thus, when the monolithic program is being executed on the grid, the script may transparently execute proper commands to mount the proper file systems on the resources provider executing the program as well as to link the proper files to the program and/or load them in memory.

Again to continue with the example above, the setup script may have proper commands to load file "A" in memory of the resources provider 450 executing the program or facilitate the executing program to link to file "A". Likewise, the setup script may have commands to mount file system "B" onto the resources provider 450 thereby allowing the program to successfully read from or write to the file system.

Alternatively, the script may be executed before the monolithic program is executed on the grid. In this case, the script may be executed by one of the resources providers 450 that is going to execute the program. During its execution, the script may mount file system "B", and link to and/or load file "A" to allow for the successful execution of the program. Upon completion of its execution, the script may instantiate the program.

Figure 5:
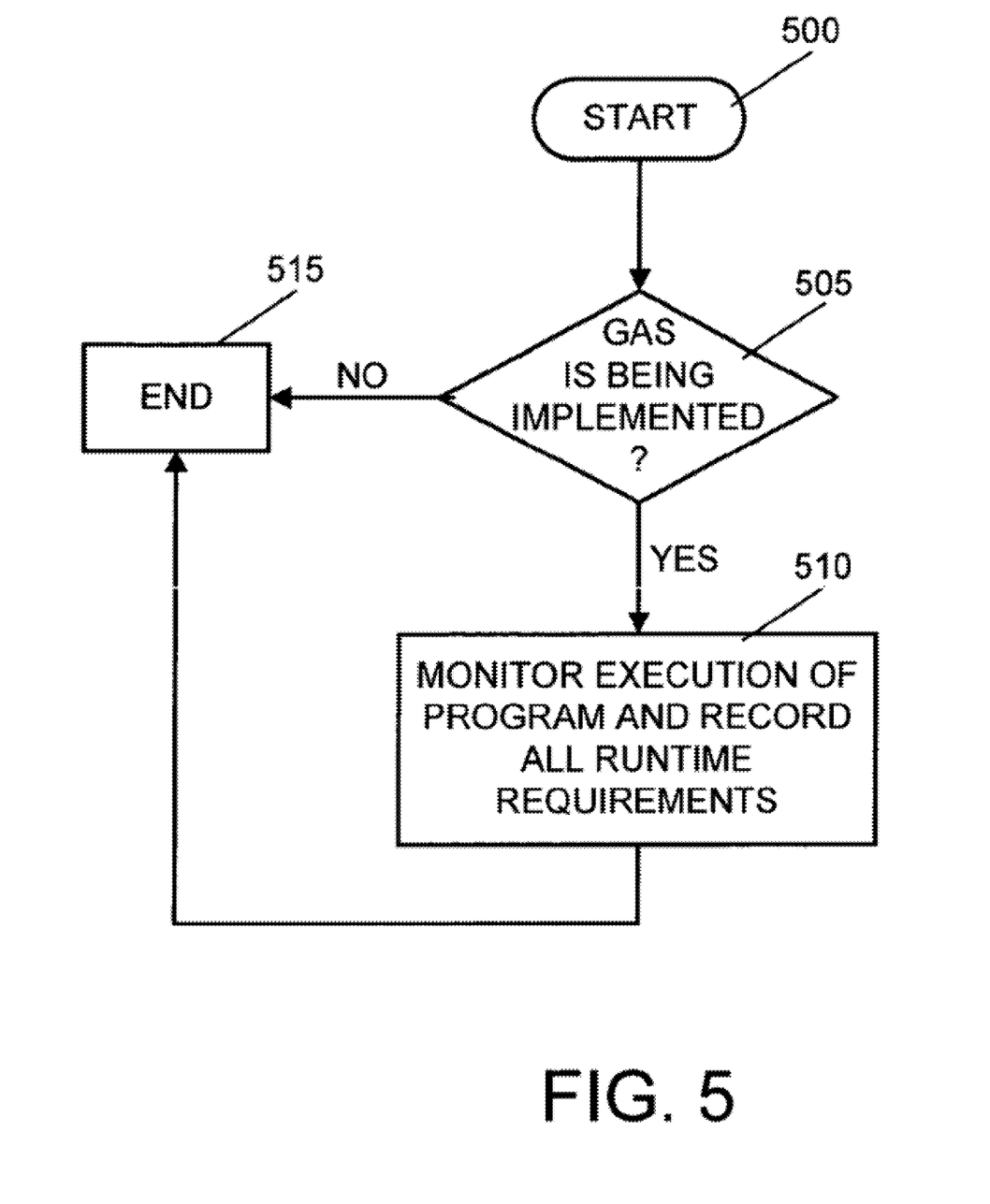
FIG. 5 is a flowchart of a process that may be used by the invention.

FIG. 5 is a flowchart of a process that may be used by the invention. The process starts when the program is being executed on the native computer system to gather up required runtime information. If the program is not being executed on the native computer system to gather up the information, the process ends. Otherwise, the information is collected by monitoring the runtime requirements of the program (steps 500, 505, 510 and 515).

Figure 6:
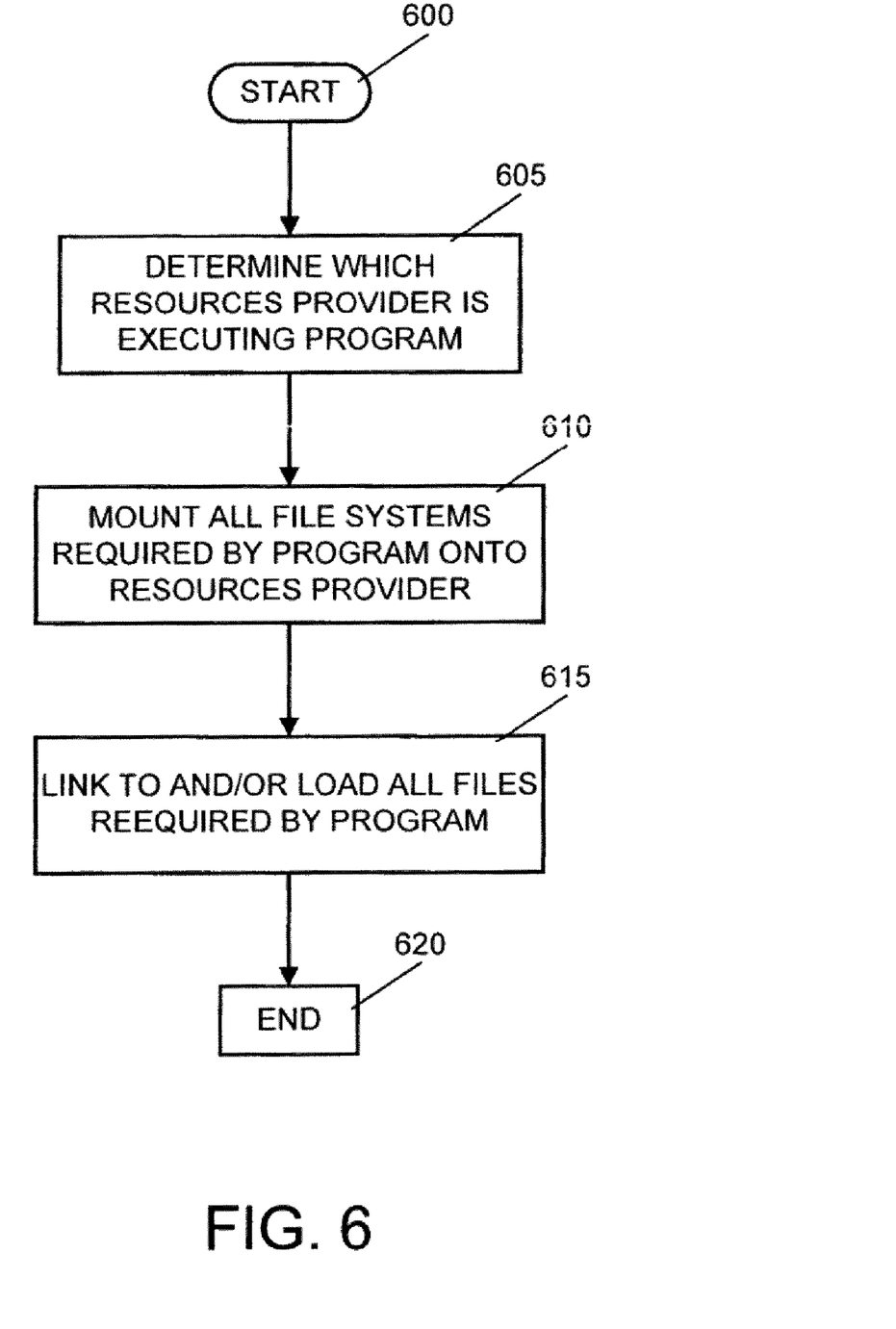
FIG. 6 is a flowchart of a first process that may be used by the invention.

FIG. 6 is a flowchart of a first process that may be used by the invention. The process starts when the program is being executed on the grid computing system. As mentioned before, the GAS (i.e., the process) will be running on the job management system 460. Consequently, the GAS will know on which one of the resources providers 450 the program is being executed. With this information, the process will mount all required file systems onto the proper resources provider 450. The process will further ensure that all files that need to be linked to the executing program as well as files that need to be loaded into the working memory of the resources provider 450 are either linked to the program or loaded in memory before the process ends (steps 600, 605, 610, 615 and 620).

Figure 7:
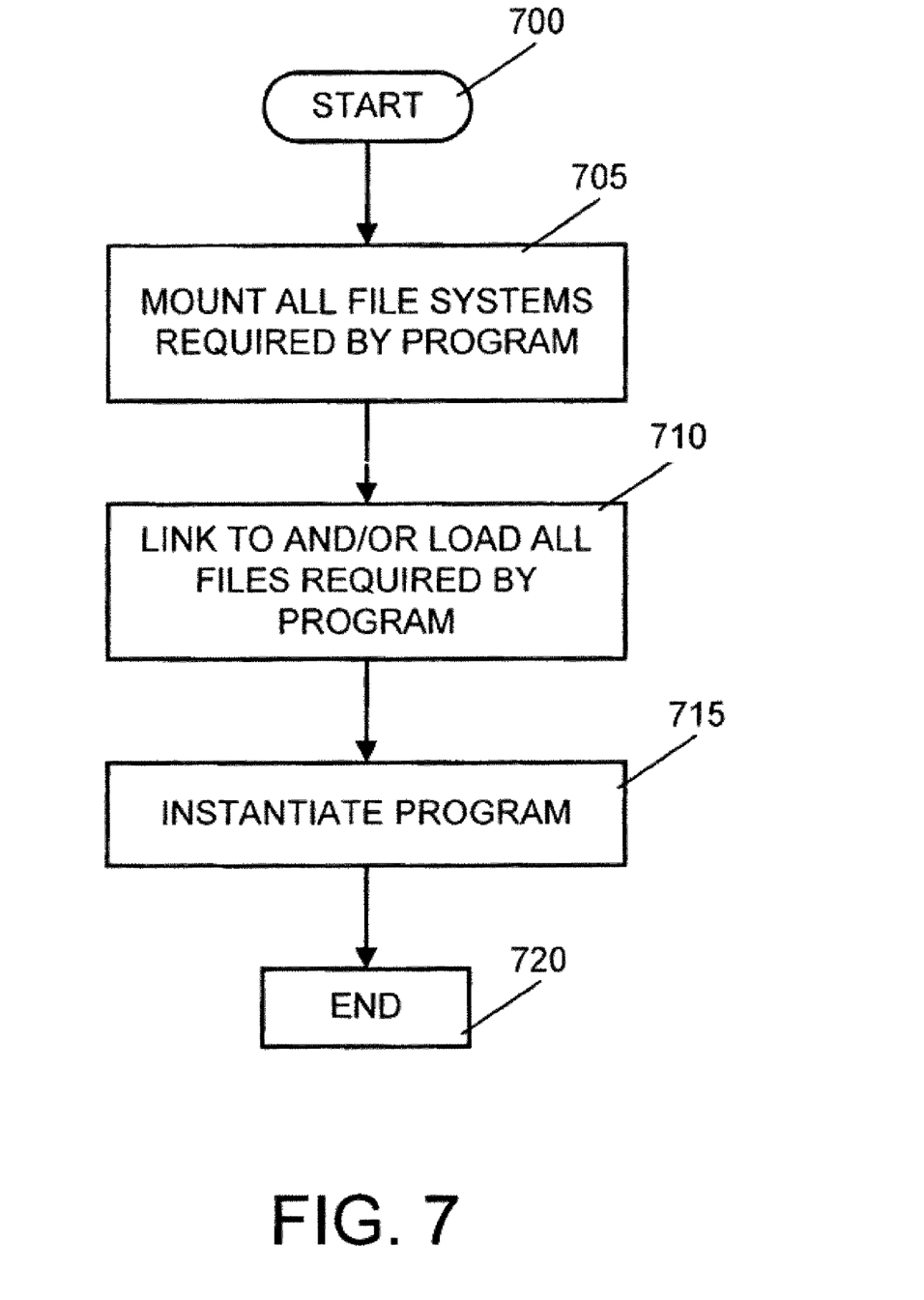
FIG. 7 is a flowchart of a second process that may be used by the invention.

FIG. 7 is a flowchart of a second process that may be used by the invention. The process starts when a resources provider 450 is to execute the program. In this case, the process will be pre-pended to the program. Thus, the process will run first. By so doing, the process will mount all required file systems onto the resources provider 450. In addition, the process will link to and/or load all requisite files, I/O files as well as library files, in memory. Before exiting, the process will instantiate the program (steps 700, 705, 710, 715 and 720).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product on a computer readable storage device for executing a monolithic program on a grid computing system comprising:
    code means for executing the program on a computer on which the program has previously successfully executed;
    code means for monitoring the execution of the program to collect runtime information of the program;
    code means for providing a computer system on the grid computing system on which the program is to be executed with the runtime information of the program; and
    code means for executing the program on the computer system on the grid computing system.

2. The computer program product of claim 1 wherein the runtime information includes file systems that are accessed by the program.

3. The computer program product of claim 1 wherein the runtime information further includes files that the program links or loads in memory.

4. The computer program product of claim 1 wherein the runtime information is provided while the program is being executed on the grid computing system.

5. The computer program product of claim 1 wherein the runtime information is provided before the program is being executed on the grid computing system.

6. An apparatus for executing a monolithic program on a grid computing system comprising:
    means for executing the program on a computer on which the program has previously successfully executed;
    means for monitoring the execution of the program to collect runtime information of the program;
    means for providing a computer system on the grid computing system on which the program is to be executed with the runtime information of the program; and
    means for executing the program on the computer system on the grid computing system.

7. The apparatus of claim 6 wherein the runtime information includes file systems that are accessed by the program.

8. The apparatus of claim 6 wherein the runtime information further includes files that the program links or loads in memory.

9. The apparatus of claim 6 wherein the runtime information is provided while the program is being executed on the grid computing system.

10. The apparatus of claim 6 wherein the runtime information is provided before the program is being executed on the grid computing system.

11. A system on a grid computer system comprising:
    at least one storage device for storing code data; and
    at least one processor for processing the code data to execute a program, the code data including runtime information for enabling the program to successfully execute on the grid computing system, the runtime information having been collected while the program is executed on a computer on which the program has previously successfully been executed.

12. The system of claim 11 wherein the runtime information includes file systems that are accessed by the program.

13. The system of claim 11 wherein the runtime information further includes files that the program links or loads in memory.

14. The system of claim 11 wherein the runtime information is provided while the program is being executed on the grid computing system.

15. The system of claim 11 wherein the runtime information is provided before the program is being executed on the grid computing system.

* * * * *